May 28, 1929.  T. A. HOOVER  1,715,034
VEHICLE SPRING
Filed March 9, 1925
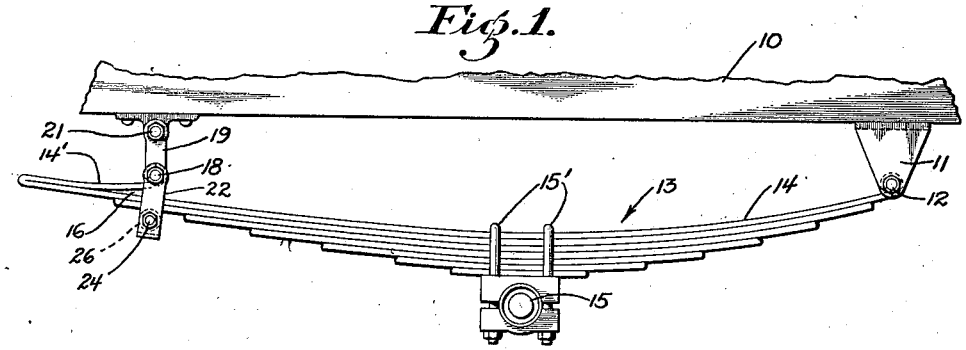
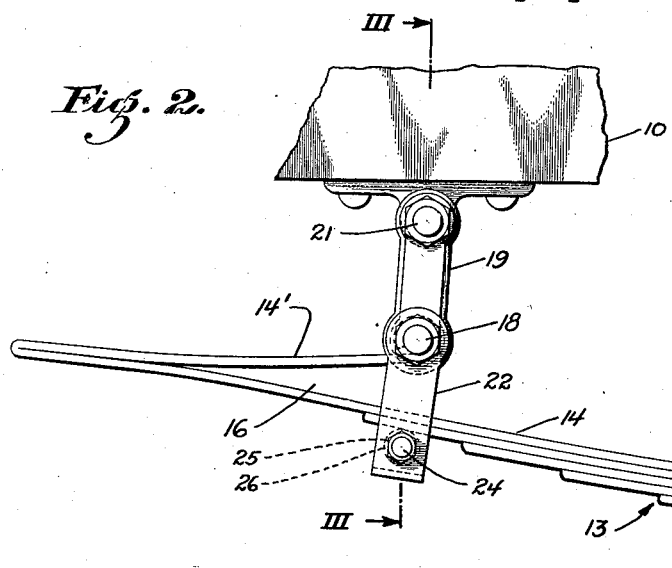
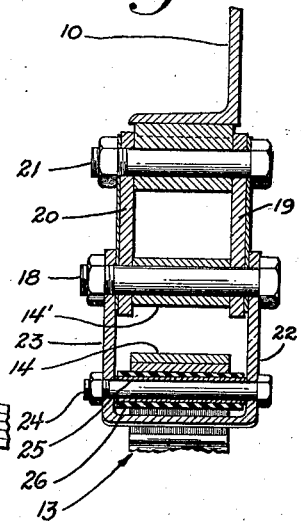
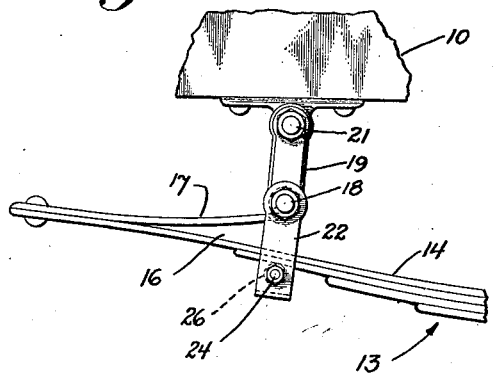
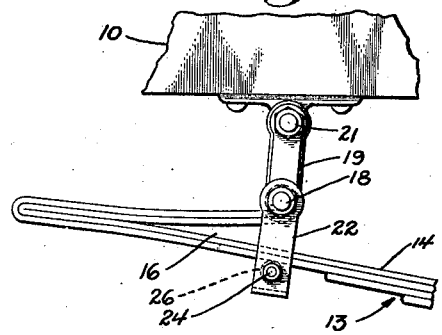
Inventor.
Thomas A. Hoover.
By
Attorneys.

Patented May 28, 1929.

1,715,034

UNITED STATES PATENT OFFICE.

THOMAS A. HOOVER, OF OAKLAND, CALIFORNIA.

VEHICLE SPRING.

Application filed March 9, 1925. Serial No. 13,954.

This invention relates to a vehicle frame suspension, and particularly pertains to a vehicle spring adapted to be interposed between the frame of a vehicle and the axles.

At the present time, it is common to support a vehicle frame, such particularly as in automobile construction, by the use of semi-elliptical or three-quarter elliptical springs mounted on the vehicle axles, and upon which the weight of the frame is imposed. These springs have been designed with an idea to obtain sufficient strength to carry the normal weight of a load superposed upon them, and to withstand the excessive force exerted against them when the wheels of the axle encounter irregularities in the roadway, or when the vehicle body rebounds after such a shock.

In addition to the provision of sufficient strength in the spring to withstand the maximum strains to which the spring might be subjected, it has at all times been attempted to provide a spring of sufficient flexibility to absorb minimum vibration imparted by the axle from the roadway, and to obtain sufficient deflection when excessive shocks are delivered to the axle to insure that a large percentage of the force is absorbed in the spring and will not be imparted to the axle.

Not the least of the problems of the spring designer is the provision of means for preventing excessive rebound of the vehicle body after an excessive shock has been transmitted to the spring through the axle, and it is the principal object of the present invention to provide a vehicle spring which is of sufficient strength to accommodate a maximum force imparted to the spring, and is yet so designed as to in a very sensitive manner absorb minor strains and vibrations, and to build up suitable resistance against the rebound force of the vehicle body.

The present invention contemplates the use of a semi-elliptical spring made of a plurality of superposed graduated leaves, the uppermost one of which is formed with a spring eye at its forward end to be pivotally connected to the frame of a vehicle, and on the rear end of which leaf are disposed a plurality of upper leaves bent over and upon themselves to produce a short upper auxiliary spring, the terminating end of which is pivotally connected through a spring shackle to the vehicle frame.

The invention is illustrated by way of example in the accompanying drawings, in which:

Fig. 1 is a side elevation showing one form of a complete spring embodying the present invention.

Fig. 2 is an enlarged fragmentary view in side elevation showing the details of construction of the auxiliary spring loop.

Fig. 3 is a view in vertical section through the spring shackle and the spring, as viewed on the line 3—3 of Fig. 2.

Fig. 4 is a fragmentary view in side elevation showing a modified form of the invention.

Fig. 5 is a fragmentary view in side elevation showing another modification of the invention, in which a plurality of the upper leaves are looped to form the auxiliary spring section.

Referring more particularly to the drawing, 10 indicates one of the side frame members of an automobile main frame. A spring bolt mounting 11 is fastened to this frame and projects downwardly to receive the spring bolt 12 of a spring 13. The bolt 12 passes through an eye in the upper leaf 14 of the spring.

As shown in Fig. 1 of the drawing, the spring is formed of laminated steel plates of graduated lengths at substantially the center of and beneath which a vehicle axle 15 is secured by clevis bolts 15'.

The general construction of the spring 13 is substantially the same as semi-elliptical vehicle springs of ordinary design, the present invention residing, however, in the structure incorporated in the rear end of the spring. This structure is shown in detail in Figs. 2 and 3, where it will be seen that the upper spring leaf 14 is bent upon itself to form a loop 16. It is to be understood that various modifications in this form might be made, as for example in Fig. 4, the loop is formed by riveting a separate piece 17 onto the spring leaf 14, while in Fig. 5, a plurality of the upper leaves are bent upon themselves to form the loop.

In the form of the invention shown in Figs. 1, 2 and 3, the loop is formed by bending an end extension 14' back upon the upper face of the leaf 14. At the point of the bend the contiguous faces of the leaf 14 and the section 14' bear directly upon each other, and gradually diverge from each other in forming a V-shaped throat of considerable length, as for example, in the construction of a vehicle spring measuring forty inches from eye to eye, the loop will add a length of seven or eight inches, and the space in the loop will have a maximum opening of approximately one inch. The contiguous faces of the spring leaf 14 and the extension 14' are adapted to gradually fold down upon each other as the spring is deflected, thus gradually building up the resistance between the supplemental spring leaf 14' and the main spring.

The terminating end of the member 14' is formed with a spring eye to receive a bolt 18. This spring bolt passes through a pair of spring shackles 19 and 20 disposed upon opposite sides of the spring eye and pivotally secured to the main frame at their upper ends by a bolt 21. Supplemental shackle plates 22 and 23 are also pivotally supported upon the spring bolt 18, and depend therefrom. These plates extend along opposite sides of the main leaves of the spring 13, and are held in fixed spaced relation to each other by a bolt 24 and a spacing bushing 25.

Mounted upon the spacing bushing is a rubber sleeve 26 which acts to deaden the sound in the event that the vehicle body rebounds, and causes the under side of the spring leaves to be struck by the sleeve on the bolt.

In operation of the present invention, it will be assumed that a vehicle is equipped with springs of the character shown in Fig. 1 of the drawing. In designing these springs, the leaves may be made of thinner material than is usual for supporting the same amount of weight, as for example, it will be assumed that a spring embodying the present invention is to displace an ordinary semi-elliptical spring forty inches long, having seven leaves of five-sixteenth inches thickness, and with a maximum deflection of four and one half inches. The new spring made according to the present invention may still be mounted upon the spring hangers carried by the frame to accommodate a forty inch spring, but the spring will be approximately forty-eight inches long, will be made of seven leaves one-quarter inch thick, and with a maximum deflection of six and one-half inches. By this design approximately fifteen to eighteen percent of the spring weight will be eliminated.

Assuming that the springs have been applied to the vehicle, it will be evident that the spring loop formed at the end of the main leaf 14 and the supplemental spring 14' will increase the deflection rate adjacent the normal position, while maintaining the original deflection rate above and below the normal position, and by such an action, it will be apparent that minor strains and vibrations imparted to the spring will be absorbed by the action of the light spring loop, and that after the loop has completely closed, the spring will then act in its customary manner to resist major shock and vibrations both above and below the normal position.

Attention is also directed to the fact that by the use of the present invention, sympathetic vibration of the spring will be eliminated when large shocks are encountered, as the auxiliary spring will tend to break up this vibration by setting vibrations of a different periodicity.

It will also be observed that the minor rebound impulses of the frame will cause the loop formed by the main leaf 14 and the auxiliary leaf 14' to open, and in so doing, will tend to check this rebound, while the major rebound force will be damped by the resistance of the main spring when the bolt 24 with its rubber casing strikes the under side of the spring leaves, and tends to draw them in a cooperative action with the auxiliary spring leaf 14'.

In the other forms of the invention indicated in Figs. 4 and 5 of the drawing, it will be evident that like results will take place, although the details of construction are slightly different.

While I have shown the preferred form of my invention as now known to me, I wish it understood that various changes may be made in its construction without departing from the spirit of the invention as claimed.

Having thus described my invention, what I claim and desire to secure by Letters Patent is—

1. In combination with an automobile running gear and a frame carried thereby, a vehicle spring supporting said frame on the running gear, comprising a semi-elliptical laminated spring formed of a plurality of graduated leaves, the uppermost of said leaves being the longest, a spring eye formed in the uppermost leaf, means for pivotally connecting said end of said leaf to the vehicle frame, a spring shackle carried by the main frame at a point on the opposite side of the center of the spring substantially at equal distances from the center of the spring to the spring eye, a continuation of the long leaf of the spring extending beneath and beyond the shackle, an auxiliary spring section disposed above said extending portion of the long spring and being fixed thereto at its outer end, said auxiliary spring section gradually diverging from the extending portion of the long leaf whereby flexure of the extending portion of the long leaf and the auxiliary spring leaf will cause these leaves to gradually close against each other, and a spring eye formed at the free end of the auxiliary leaf and pivotally secured to said spring shackle.

2. In combination with an automobile running gear and a frame carried thereby, a vehicle spring supporting said frame on the running gear, comprising a semi-elliptical laminated spring formed of a plurality of graduated leaves, the uppermost of said leaves being the longest, a spring eye formed in the uppermost leaf, means for pivotally connecting said end of said leaf to the vehicle frame, a spring shackle carried by the main frame at a point on the opposite side of the center of the spring substantially at equal distances from the center of the spring to the spring eye, a continuation of the long leaf of the spring extending beneath and beyond the shackle, an auxiliary spring section disposed above said extending portion of the long spring and being fixed thereto at its outer end, said auxiliary spring section gradually diverging from the extending portion of the long leaf whereby flexure of the extending portion of the long leaf and the auxiliary spring leaf will cause these leaves to gradually close against each other, a spring eye formed at the free end of the auxiliary leaf and pivotally secured to said spring shackle, a stirrup pivotally dependent from said shackle and carrying a stop member extending beneath the main spring and adapted to engage the same on rebound of the vehicle frame.

3. In combination with an automobile running gear and a frame carried thereby, a vehicle spring supporting said frame on the running gear, comprising a semi-elliptical laminated spring formed of a plurality of graduated leaves, the uppermost of said leaves being the longest, a spring eye formed in the uppermost leaf, means for pivotally connecting said end of said leaf to the vehicle frame, a spring shackle carried by the main frame at a point on the opposite side of the center of the spring substantially at equal distances from the center of the spring to the spring eye, a continuation of the long leaf of the spring extending beneath and beyond the shackle, an auxiliary spring section disposed above said extending portion of the long spring and being fixed thereto at its outer end, said auxiliary spring section gradually diverging from the extending portion of the long leaf whereby flexure of the extending portion of the long leaf and the auxiliary spring leaf will cause these leaves to gradually close against each other, a spring eye formed at the free end of the auxiliary leaf and pivotally secured to said spring shackle, a stirrup pivotally dependent from said shackle and carrying a stop member extending beneath the main spring and adapted to engage the same on rebound of the vehicle frame, and a buffer member forming a part of said stop.

4. In combination with an automobile axle and an automobile main frame, a front spring mounting and a rear spring mounting disposed substantially equal distances upon opposite sides of the vertical center of the axle and being secured to the frame, a spring bolt carried by said front spring mounting, spring shackles pivotally carried by said rear spring mounting, a vehicle spring formed of a plurality of spring leaves progressively increasing in length from the lowermost leaf to the main leaf, an eye formed in one end of said main leaf and being pivotally secured to the front spring mounting by the spring bolt, the opposite end of said main leaf extending beneath and beyond the rear spring mounting and forming a relatively flexible leaf extension, an auxiliary spring leaf fixed to the outer end of said extension of the main leaf and extending above the extending portion of said main leaf and gradually diverging therefrom, a spring eye in the free end of said auxiliary leaf and a shackle pin pivotally securing said eye to the spring shackle whereby excessive load upon the vehicle frame or shock to the wheels of the axle will cause the extension of the main leaf and auxiliary leaf to gradually flex toward each other and to progressively contact along their contiguous faces, a stirrup hanging from the shackle bolt and embracing the spring and a resilient buffer member carried by the stirrup and adapted to engage the under face of the spring when rebound action takes place.

THOMAS A. HOOVER.